United States Patent
Hathorn

[15] 3,641,978
[45] Feb. 15, 1972

[54] COATING APPARATUS

[72] Inventor: George Stuart Hathorn, Dagenham, Dock, England

[73] Assignee: Porvair Limited, Dagenham, Dock, England

[22] Filed: Jan. 7, 1969

[21] Appl. No.: 789,570

[30] Foreign Application Priority Data

Jan. 9, 1968 Great Britain..........................1,260/63

[52] U.S. Cl..............................118/412, 118/413, 118/415, 118/428

[51] Int. Cl........................................B05c 3/18, B05c 3/12

[58] Field of Search...................118/412, 411, 413, 415, 428

[56] References Cited

UNITED STATES PATENTS

| 1,957,611 | 5/1934 | Pelton | 118/415 X |
| 2,932,855 | 4/1960 | Bartlett et al. | 118/412 X |
| 3,206,323 | 9/1965 | Miller et al. | 118/411 X |

Primary Examiner—John P. McIntosh
Attorney—Watson, Cole, Grindle & Watson

[57] ABSTRACT

Coating apparatus suitable for depositing superimposed layers of two different viscous liquids or pastes on a support is provided which comprises a pair of hoppers having one lip common to both hoppers, forming the downstream lip of the upstream hopper and the upstream lip of the downstream hopper.

1 Claims, 2 Drawing Figures

COATING APPARATUS

The present invention relates to coating apparatus for making sheet material which, for one reason or another, is made in two or more superimposed layers. Such a material can conveniently be made by a process which includes the step of coating the working ingredients while in a viscous liquid or pasty state on a support.

According to the present invention, coating apparatus suitable for depositing superimposed layers of two different viscous liquids or pastes on a support comprises a pair of hoppers respectively adapted to contain coating material and each having a narrow outlet slot beneath which a support is arranged to be passed to deposit a layer of the associated material, each outlet slot being bounded by upstream and downstream lips whereof each downstream lip forms a doctor blade to determine and smooth the upper surface of the associated material, in which one lip is common to both hoppers, forming the downstream lip of the upstream hopper and the upstream lip of the downstream hopper. Each downstream lip may be adjustable so as to provide a variable outlet slot width.

The material used for one layer may be of a higher viscosity than that used for a succeeding layer, but the apparatus can be used even when this requirement is not fulfilled.

The apparatus in accordance with the present invention reduces the danger of air being entrapped between the layers with consequent reduction in the strength of bonding between the layers. It also prevents the downstream paste or liquid from leaking beneath its doctor blade.

There are various reasons for making a layered material such as the present one. For example, natural leather comprises a main fiber layer and a surface layer termed the grain layer, and in making an artificial leather it is often thought desirable to provide two layers having rather different properties to simulate these two layers of natural leather. In other cases the purpose of the exposed layer may be merely to give a pleasing appearance or a desired color while employing for the greater part of the thickness a material having other desirable qualities such as strength or toughness, or cheapness. Again it may be desirable that the exposed layer should be waterproof while the other layer may have a degree of water absorbency.

The difficulty has arisen in process for making layered microporous materials in which the working ingredients for one layer are applied to an already formed lower layer that the solvent employed in the former partly dissolves the surface of the latter and adversely affects its structure, for example, by collapsing its micropores. To overcome this difficulty it has been proposed to interpose a tie layer between the two layers, the solvent for each layer being chosen so as not to dissolve or adversely affect the preceding layer. Naturally this adds considerably to the complexity of the method.

It has been found that if the mixture from which the upper layer is formed is deposited on the lower layer mixture before the latter is coagulated or solidified, the two layers can be coagulated at the same time and the difficulties referred to above do not arise. This forms the subject of the commonly owned U.S. Pat. application Ser. No. 697,165, 165 filed Jan. 11, 1968, which relates to a process of making a layered and porous water vapor permeable flexible sheet material, and the present invention is particularly, through not exclusively applicable to the process described in that specification.

The hopper outlets may be arranged around a roll and the support, which may be of strip form, and may be passed around the roll so as to be supported by the roll as it passes beneath the hoppers.

The hoppers can be fed with the coating material under pressure and thus need not be located at the top of the roll. However, it is convenient for the coating material to be discharged under gravity since is simplifies the apparatus. It is thus preferable to locate the hoppers at the top of the roll.

One embodiment of the invention, in which the apparatus is used to coat two different pastes on to a strip of support material, will now be described with reference to the accompanying drawings, in which.

Figure 1:
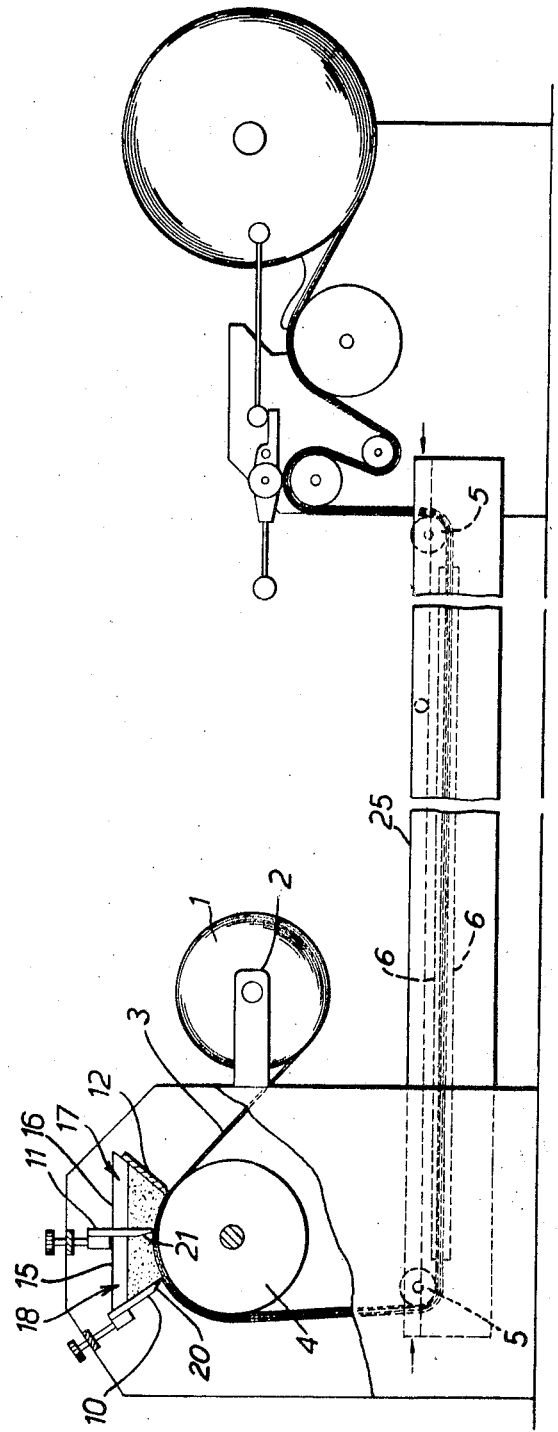
FIG. 1 is a diagrammatic side elevation of the coating apparatus.
Figure 2:
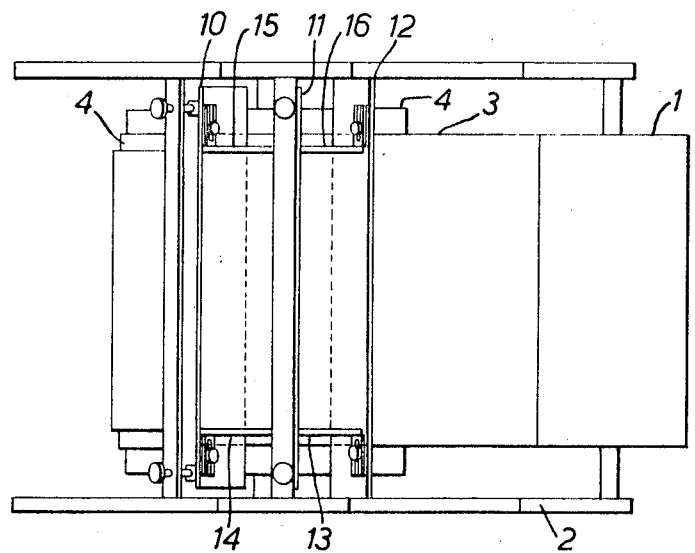
FIG. 2 is a diagrammatic plan view of the coating apparatus.

In this embodiment, the apparatus is used to coat two different pastes of polymeric plastics material, a substrate paste and a less viscous top coat paste, on to a flexible strip of support material through as mentioned above, the apparatus is also suitable for coating materials having a different relationship between their viscosities. The support material, which in this case is a strip of porous polyethylene sheet material, is mounted as a roll 1 on a braked wind-off stand 2 from which it passes as at 3 around a ground steel spreading roll 4, and then, by way of guide rolls 5 and guideway strips 6 to further processing stages including a dunk tank 25 where the spread pastes are coagulated by immersion in a treatment liquid and thereby solidified to form superimposed solid layers. Guideway strips 6, a single pair of which are only shown in FIG. 1, are mounted along the inner sidewalls of tank 25 at opposite sides of the support material.

Located just above the spreading roll, in the vicinity of its vertical centerline, is the coating apparatus. This comprises, in order (from left to right in FIG. 1) a downstream doctor blade 10, an upstream doctor blade 11 and an upstream backing plate 12, all three components being arranged in planes containing a line parallel to the axis of the spreading roll 4. The lower edge of the backing plate 12 is held against the support 3 as it moves around the spreading roll 4, while the lower edges of the doctor blades 10 and 11 are held a short but adjustable distance above it, that of the upstream blade 11 being the closer to the support 3. Cheekpieces 13, 14, 15 and 16 are held across the spaces between the blades 10 and 11 and the backing plate 12 to define a pair of hoppers 17 and 18, the former between the backing plate 12 and the upstream blade 11, and the latter between the doctor blade 10 and the doctor blade 11 (which forms a backing plate for the hopper 18).

The doctor blades 10 and 11 have chamfered trailing edges 20 and 21 respectively, and flat bases, in an alternative arrangement, it is the leading edges of the blades that are chamfered.

The detailed geometry of the coating apparatus, and its precise location with respect to the spreading roll, depends to some extent on the nature of the two pastes, by a typical arrangement is as follows:

Diameter of spreading roll 4: 18 inches.

Gap setting of doctor blade 10 from the support 3: 0.125 inches.

Gap setting of doctor blade 11 from the support 3: 0.100 inches.

The doctor blade 11 is parallel to the vertical center line of the spreading roll 4, but somewhat to its right as viewed in FIG. 1. The doctor blade 10 and the backing plate 12 are arranged on either side of the doctor blade 11, sloping away from it at angles of 35° and 39° respectively, the three components lying in planes which intersect in a line parallel to the axis of the roll 4 and displaced from it horizontally.

A supply of topcoat paste is placed in the hopper 18 and a supply of substrate paste in the hopper 17. The doctor blades 10 and 11 are adjusted to provide appropriate gaps between their lower edges and the surface of the support 3.

Thus, as the support 3 is fed from its braked wind off roll around the spreading roll 4, a layer of substrate paste is spread on its surface by the upstream doctor blade 11, and then, in close succession, a layer of topcoat paste is spread on the layer of substrate paste by the downstream doctor blade 10.

The arrangement described gives a substrate wet coating thickness of the order of 0.09 inches for a substrate paste of viscosity of the order of 200,000±10,000 centipoise, and a topcoat wet coating thickness of the order of 0.05 inches for a topcoat paste of viscosity of the order of 100,000±10,000 centipoise, the viscosities being measured at 25° C. viscosities were measured on a Brookfield R.V.T. Viscometer using a No. 7 Spindle at 10 r.p.m.

The apparatus has been used to produce coatings up to 3 mm. thick and has been used with pastes having viscosities of the order of 25,000 centipoise to 2,000,000 centipoise.

Further details of the method and apparatus are described in the above-mentioned U.S. Pat. application Ser. No. 697,165.

What we claim as our invention and desire to secure by Letters Patent is:

1. Coating apparatus comprising a support of strip form, a roller, a pair of hoppers, the support being arranged to pass around said roller and be supported by said rollers as it passes beneath said hoppers, tank means adapted to contain liquid, and guide means, whereby said support may be passed from said roller through said tank means beneath the surface of the liquid in said tank, when the apparatus is in use, with said support uppermost under the guidance of said guide means, said pair of hoppers respectively being adapted to contain coating material and each of said pair of hoppers having a narrow outlet slot beneath which said support is arranged to be passed to deposit a layer of the associated material, each said outlet slot being bounded by upstream and downstream lips wherein each said downstream lip forms a doctor blade to determine and smooth the upper surface of the associated material independently through each said outlet slot, one of said lips being common to both said hoppers thereby forming the downstream lip of said upstream hopper and the upstream lip of the downstream hopper, and said hopper outlets being arranged around the periphery of said roller.

* * * * *